May 28, 1929.    M. KADEN    1,715,295

SECURITY CHAIN

Filed May 11, 1927

Inventor:
Max Kaden,
Louis M. Schmidt
Atty.

Patented May 28, 1929.

1,715,295

UNITED STATES PATENT OFFICE.

MAX KADEN, OF NEW BRITAIN, CONNECTICUT.

SECURITY CHAIN.

Application filed May 11, 1927. Serial No. 190,589.

My invention relates to improvements in security chains for use with a household door for limiting the amount of opening thereof so as to prevent the admission of unauthorized individuals or intruders by the use of a chain that is looped around the stem of the door-knob, back of said knob, and the object of my improvement is to produce a chain length and associated parts such that with one end of the chain secured to the casing and the other provided with a hook that is adapted to be threaded by one of its arms through one of the links and with means for securing said arm, an effective checking means will be provided.

In the accompanying drawing:—

Figure 1:
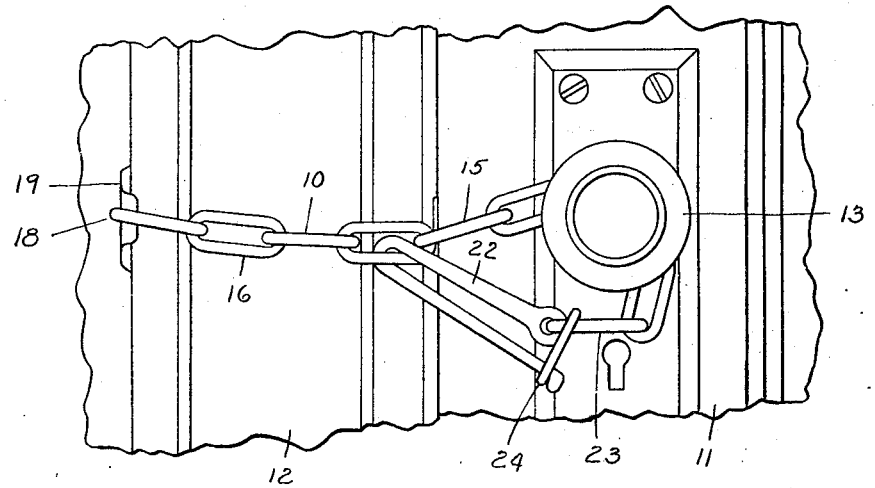
Figure 1 is a side elevation showing part of a door and casing and with my improved security chain incorporated therewith and arranged in the position for limiting the amount of opening of the door.
Figure 2:
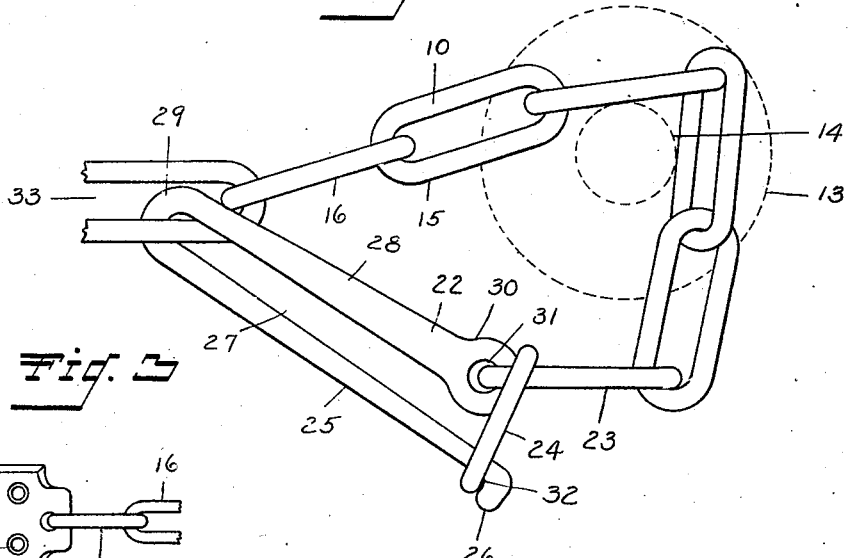
Figure 2 is a similar view on an enlarged scale of the hook end chain in substantially the same position as in Fig. 1, the door-knob and stem thereof being indicated by broken lines.
Figure 3:
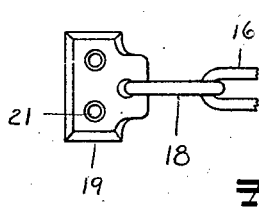
Figure 3 is a view of the chain structure and holding plate, and on a smaller scale.
Figure 4:
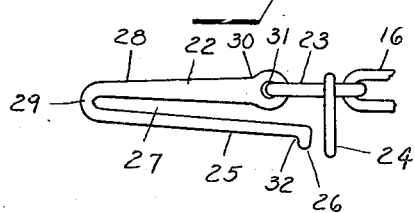
Figure 4 shows the hook, the adjacent link, and the securing loop.

My improved security chain comprises a chain structure 10 that is applied to a door 11 and door casing 12 for cooperation with the door-knob 13 and stem 14 thereof for use in limiting the amount of opening of the door 11 that will be permitted.

The chain structure 10 comprises a chain length 15 that, as shown, is made up of a set of ten links 16, and at the fixed end thereof the end link 18 is connected to a holding plate 19 by being hooked through an opening 20 therein. Said plate 19 has other openings 21 for screws by which it is fastened to the door casing 12.

At the movable end is provided a hook 22 that is connected to the adjacent link 23 at the end of the chain length 15, said hook 22 having certain special features, as will be described. Also, there may be provided a securing link 24 in the form of a closed link that is interlooped with the end link 23 and that serves as securing means for engaging with the free arm 25 of the hook 22. At the tip end of said free arm 25 there is an outwardly directed stop shoulder 26 for resisting any tendency under conditions of use for the securing link 24 to slide off from said free arm 25.

Considering the details of the hook 22, the same comprises two relatively elongated arms that are located side by side, separated by a receiving space 27 for admitting the wire material of which the links 16 are formed and with one of which links 16 the hook is engaged in the active door securing position or condition. Said arms comprise the free arm 25 already mentioned and the supporting arm 28 that is connected to the adjacent end link 23.

A yoke 29 connects the arms 22 and 28 by their outer ends. At the inner end of the supporting arm 28 is an eye 30 that has an opening 31 for receiving the wire of the adjacent end link 23.

As described, the end link or junction link 23 is connected to the hook 22 and also supports the locking link 24. Also, the securing link 24 has limited sliding movement along the junction link 23.

The following details will be noted:—The parts are constructed and arranged so that by having the free arm 25 slightly though appreciably longer than the supporting arm 28 so that the shouldered top end 26 of the free arm 25 projects inwardly beyond the eye 30 and the securing notch 32 back of the shoulder 26 is accessible to the securing link 24 and may be engaged therewith. It is in the manner just described that the securing link 24 is utilized to effect the securing after the chain structure has been arranged and adjusted to effect the checking of the door. That is to say, the chain length or chain proper 15 is slung around the door-knob stem 14, back of the door-knob 13; the hook 22 is engaged with a link 16 by entering the free arm 25 through the opening 33 therein; the particular link 16 is slid along the space 27 between the arms 25 and 28 towards the yoke 27; and, finally the securing link 24 is slung over the free end and stop shoulder 26 and brought into engagement with the securing notch 32.

Thus the device serves to limit the degree of opening of the door 11 to an extent dependent upon the length provided for the chain proper and, also, the securing devices are located so as to be inaccessible for manipulation from the outside.

I claim as my invention:—

In a security chain structure, a link and chain combination comprising a hook having a pair of relatively elongated arms that are extended in parallelism, one of said arms serving as the supporting arm and being provided at the free end with an eye, the other of said arms having the free end portion projected outwardly beyond said eye, a securing link mounted for sliding on and off said free end portion, a link connected with said eye and positioned adjacent said free end portion, and said last named link serving as the supporting means for said securing link.

MAX KADEN.